United States Patent
Raven et al.

(10) Patent No.: US 12,479,197 B2
(45) Date of Patent: Nov. 25, 2025

(54) BAG FOR CONTAINING BULK GOODS

(71) Applicant: SABIC GLOBAL TECHNOLOGIES B.V., Bergen op Zoom (NL)

(72) Inventors: Bernardus Aldegonda Josephus Raven, Oirsbeek (NL); Bart Van Den Esschert, Sittard (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 433 days.

(21) Appl. No.: 17/767,607

(22) PCT Filed: Sep. 21, 2020

(86) PCT No.: PCT/EP2020/076240
§ 371 (c)(1),
(2) Date: Apr. 8, 2022

(87) PCT Pub. No.: WO2021/069194
PCT Pub. Date: Apr. 15, 2021

(65) Prior Publication Data
US 2024/0075726 A1    Mar. 7, 2024

(30) Foreign Application Priority Data
Oct. 9, 2019  (EP) ..................................... 19202206

(51) Int. Cl.
*B32B 27/32* (2006.01)
(52) U.S. Cl.
CPC ........ *B32B 27/327* (2013.01); *B32B 2250/03* (2013.01); *B32B 2307/558* (2013.01); *B32B 2307/718* (2013.01); *B32B 2307/7376* (2023.05); *B32B 2439/06* (2013.01)

(58) Field of Classification Search
None
See application file for complete search history.

(56) References Cited

U.S. PATENT DOCUMENTS

| | | | |
|---|---|---|---|
| 2007/0260016 A1 | 11/2007 | Best et al. | |
| 2012/0100356 A1 | 4/2012 | Ohlsson et al. | |
| 2013/0059140 A1* | 3/2013 | Hlavinka | B32B 27/32 428/220 |
| 2017/0129229 A1* | 5/2017 | Wang | C08J 5/18 |

OTHER PUBLICATIONS

International Search Report for International Application No. PCT/EP2020/076240, International Filing Date Sep. 21, 2020, Date of Mailing Nov. 10, 2020, 6 pages.
Sabic "Sabic Hope F00952 High Density Polyethylene Typical Property Values", Apr. 19, 2019 (Apr. 19, 2019), XP055657433, Retrieved from the Internet: URL :https ://www.sabic.com/en/products/polymers/polyethylene-pe/sabic-hdpe, [retrieved on Jan. 13, 2020].
Sabic "Sabic Supeer 7118NE Typical Property Values", May 7, 2019 (May 7, 2019), pp. 1-2, XP055657430, Retrieved from the Internet: https ://www.sabic.com/en/products/polymers/metallocene-polyethylene-mpe/sabic-supeer [retrieved on Jan. 13, 2020].
Written Opinion for International Application No. PCT/EP2020/076240, International Filing Date Sep. 21, 2020, Date of Mailing Nov. 10, 2020, 11 pages.

* cited by examiner

*Primary Examiner* — Ramsey Zacharia
(74) *Attorney, Agent, or Firm* — CANTOR COLBURN LLP

(57) ABSTRACT

The present invention relates to a bag for storing bulk goods, wherein the bag comprises a multi-layer film comprising: (a) a first outer layer (c) a core layer; and (e) a second outer layer wherein the layers (a), (c) and (e) are positioned vis-à-vis each other in this order; wherein the multi-layer film comprises: •≥50.0 wt %, preferably ≥50.0 and ≤80.0 wt %, with regard to the total weight of the multi-layer film, of a polymer (A) comprising moieties derived from ethylene and moieties derived from 1-hexene, wherein the polymer (A) has: (i) a density of ≥910 and ≤930 kg/m3 as determined in accordance with ASTM D792 (2008); (ii) a melt mass-flow rate of ≥0.5 and ≤5.0 g/10 min, as determined in accordance with ASTM D1238 (2013) at a temperature of 190° C. under a load of 2.16 kg; (iii) a fraction that is eluted in analytical temperature rising elution fractionation (a-TREF) at a temperature≤30.0° C. of ≤6.0 wt %, with regard to the total weight of the polymer; and (iv) a fraction eluted in a-TREF at a temperature>94.0° C. of ≥20.0 wt %, with regard to the total weight of the polymer; and •≥20.0 and ≤50.0 wt %, preferably ≥20.0 and ≤40.0 wt %, with regard to the total weight of the multi-layer film, of a polymer (B) comprising moieties derived from ethylene and moieties derived from 1-butene, 1-hexene, or 1-octene, preferably ≥0.5 and ≤5.0 wt % of moieties derived from 1-butene, 1-hexene, or 1-octene, wherein the polymer (B) has: (v) a density of ≥945 and ≤965 kg/m3 as determined in accordance with ASTM D792 (2008); (vi) a melt mass-flow rate of ≥0.01 and ≤1.00, preferably ≥0.01 and ≤0.50, preferably ≥0.01 and ≤0.10 g/10 min, as determined in accordance with ASTM D1238 (2013) at a temperature of 190° C. under a load of 2.16 kg; and 19POLY0091-WO-PCT 19 Classification: General Business Use (vii) a melt mass-flow rate of ≥5.0 and ≤50.0, preferably ≥5.0 and ≤25.0 g/10 min, as determined in accordance with ASTM D1238 (2013) at a temperature of 190° C. under a load of 21.6 kg. [0044] Such bag may be manufactured via blow film extrusion at high speeds and high bubble stability, and such bag has a desirably high dart impact strength.

18 Claims, No Drawings

BAG FOR CONTAINING BULK GOODS

CROSS REFERENCE TO RELATED APPLICATIONS

This application is a National Stage application of PCT/EP2020/076240, filed Sep. 21, 2020, which claims the benefit of European Application No. 19202206.9, filed Oct. 9, 2019, both of which are incorporated by reference in their entirety herein.

The present invention relates to a bag for containing bulk goods. In particular, the invention relates to a bag produced from a polyethylene film.

In the field of packing bulk goods, particularly powdery or granular bulk goods, a typical type of packaging is in quantities of multiple kilograms of the bulk materials, such as for example between 5 and 50 kg of the materials. Such packaging typically is done using plastic bags. For example, such plastic bags each may contain a quantity of e.g. 10, 20, 25 or 50 kg of the bulk material. Such bags are also referred to as heavy-duty bags.

Typically, during the logistics operations involving the use of such bags, a multitude of such bags is stacked onto a pallet. Such pallet may then contain for example between 20 and 100 of the bags. Such bags typically are positioned onto a pallet lying flat, so that they rest on the sidewalls. A number of bags, such a 4 or 5, are positioned onto the pallet to form a layer, onto which a further number of bags are placed to form another layer, which may be repeated so that a fully loaded pallet may contain a considerable number of layers, such as between 5 and 25 layers, of each a number of bags positioned flat on their sidewalls.

Such stack of bags positioned in layers onto a pallet represents a considerable weight. In order for the bags to maintain their position on the pallet, there are certain specifications to which the plastic material of which the bags are made needs to comply.

Bags for containing bulk goods, as according to the invention, may be produced via blown film extrusion. In blown film extrusion, the polymer matter is, in a continuous process, converted via a melt extruder into a molten stream of matter, which is extruded via a typically circular die, and by means of a gaseous stream, such as an air stream, is formed into a tubular film, which, upon cooling by air, forms a solidified, plastic film. To the circular die, resin may be provided from multiple melt extruders, allowing to form a multi-layer film, such as a 3-layer film, or a 5-layer film. Subsequently, the film is rolled up. The tubular film as formed in the stage between the die and the roll-up section is known as the bubble. The gaseous stream is typically of such dimensions to allow the matter that exits the circular die, which in that stage is in a liquid state, to be expanded before solidification. The ratio between the radius of the circular die and the radius of the tubular film as formed is known as the blow-up ratio.

The production of the blown film typically occurs at speeds that are as high as the equipment and the materials to be converted allow, in order to provide an optimal process efficiency. A limiting factor therein is the stability of the formed tubular film in the bubble stage. The high processing speeds may result in instabilities, such as flutter, that may lead to collapse of the bubble, and thereby interruption of the continuous production of the film.

It will be understood that for maximisation of process and materials economy, a good bubble stability is an essential element. The bubble stability is affected by the selection of the polymer material that are used to form the film of. Therefore, in the production of bags for bulk goods, as in the present invention, it is required that the material allow for the film contribute to good bubble stability in the manufacturing.

Further, it is required that the bag itself has mechanical properties that allow its purpose, namely storage of the bulk goods for a certain period, and under typical circumstances. For example, such bulk bags may contain a certain quantity of bulk products, for example polymeric pellets, inorganic powdery materials, powdery food products such as flour, and products of similar powdery or granular nature. Typically, multiple of such bags are stacked together onto pellets, and during storage and logistics, may be subject to certain external forces, for example of blunt or sharp impacts. The film of which the bags are produced accordingly needs to withstand certain impact forces, as demonstrated by the dart impact strength determined in accordance with ASTM D1709, method A.

Accordingly, there is a need to provide a bag that has a desirably high drat impact strength, which can be produced via blown film extrusion at high speed at high bubble stability. This is now provided according to the present invention by a bag for storing bulk goods, wherein the bag comprises a multi-layer film comprising:

(a) a first outer layer
(c) a core layer; and
(e) a second outer layer
wherein the layers (a), (c) and (e) are positioned vis-à-vis each other in this order;
wherein the multi-layer film comprises:
  ≥50.0 wt %, preferably ≥50.0 and ≤80.0 wt %, with regard to the total weight of the multi-layer film, of a polymer (A) comprising moieties derived from ethylene and moieties derived from 1-hexene, wherein the polymer (A) has:
  (i) a density of ≥910 and ≤930 kg/m$^3$ as determined in accordance with ASTM D792 (2008);
  (ii) a melt mass-flow rate of ≥0.5 and ≤5.0 g/10 min, as determined in accordance with ASTM D1238 (2013) at a temperature of 190° C. under a load of 2.16 kg;
  (iii) a fraction that is eluted in analytical temperature rising elution fractionation (a-TREF) at a temperature≤30.0° C. of ≤6.0 wt %, with regard to the total weight of the polymer; and
  (iv) a fraction eluted in a-TREF at a temperature>94.0° C. of ≥20.0 wt %, with regard to the total weight of the polymer; and
  ≥20.0 and ≤50.0 wt %, preferably ≥20.0 and ≤40.0 wt %, with regard to the total weight of the multi-layer film, of a polymer (B) comprising moieties derived from ethylene and moieties derived from 1-butene, 1-hexene, or 1-octene, preferably ≥0.5 and ≤5.0 wt % of moieties derived from 1-butene, 1-hexene, or 1-octene, wherein the polymer (B) has:
  (v) a density of ≥945 and ≤965 kg/m$^3$ as determined in accordance with ASTM D792 (2008);
  (vi) a melt mass-flow rate of ≥0.01 and ≤1.00, preferably ≥0.01 and ≤0.50, preferably ≥0.01 and ≤0.10 g/10 min, as determined in accordance with ASTM D1238 (2013) at a temperature of 190° C. under a load of 2.16 kg; and
  (vii) a melt mass-flow rate of ≥5.0 and ≤50.0, preferably ≥5.0 and ≤25.0 g/10 min, as determined in accordance with ASTM D1238 (2013) at a temperature of 190° C. under a load of 21.6 kg.

Such bag may be manufactured via blow film extrusion at high speeds and high bubble stability, and such bag has a desirably high dart impact strength.

For example, the polymer (A) may have:
- a fraction (iii) that is eluted in a-TREF at a temperature≤30.0° C. is ≥1.0 and ≤6.0 wt %, with regard to the total weight of the polymer; and/or
- a fraction (iv) that is eluted in a-TREF at a temperature>94.0° C. is ≥20.0 and ≤40.0 wt %, with regard to the total weight of the polymer; and/or
- a the fraction that is eluted in a-TREF at a temperature>30.0 and ≤94.0° C. is ≥54.0 and ≤79.0 wt %.

According to the invention, analytical temperature rising elution fractionation, also referred to as a-TREF, may be carried out using a Polymer Char Crystaf-TREF 300 with a solution containing 4 mg/ml of sample prepared in 1,2-dichlorobenzene stabilised with 1 g/l Topanol CA (1,1,3-tri (3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and optionally further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

For example, the density of the polymer (A) may be ≥910 and ≤925 kg/m³, preferably ≥915 and ≤925 kg/m³, more preferably ≥915 and ≤920 kg/m³.

For example, the polymer (A) may have a melt mass-flow rate of ≥0.5 and ≤4.0 g/10 min, as determined in accordance with ASTM D1238 (2013) at a temperature of 190° C. under a load of 2.16 kg, preferably ≥0.5 and ≤3.0 g/10 min, more preferably ≥0.5 and ≤2.0 g/10 min.

For example, the polymer (A) may comprise a fraction that is eluted in analytical temperature rising elution fractionation (a-TREF) at a temperature≤30.0° C. of ≤5.0 wt %, preferably ≤4.0, more preferably ≤3.0, with regard to the total weight of the polymer (A). Such content of this fraction indicates a relatively low quantity of amorphous matter to be present in the polymer (A).

For example, the polymer (A) may comprise a fraction eluted in a-TREF at a temperature>94.0° C. of ≥20.0 wt %, preferably ≥20.0 and ≤40.0 wt %, more preferably ≥22.5 and ≤30.0 wt %, even more preferably ≥25.0 and ≤30.0 wt %, with regard to the total weight of the polymer. Such quantity of this fraction indicates a relatively high quantity of linear polymer chains to be present in polymer (A).

For example, the polymer (A) may comprise ≥2.5 and ≤20.0 wt %, preferably ≥5.0 and ≤15.0 wt %, more preferably ≥5.0 and ≤10.0 wt %, of moieties derived from 1-hexene, with regard to the total weight of the polymer (A).

The quantity of moieties derived from 1-hexene in the polymer (A) and the quantity of moieties derived from 1-butene, 1-hexene or 1-octene in polymer (B) may for example be determined by $^{13}C$ NMR on a Bruker Avance 500 spectrometer equipped with a cryogenically cooled probe head operating at 125° C., whereby the samples are dissolved at 130° C. in $C_2D_2Cl_4$ containing DBPC as stabiliser.

The polymer (A) may for example have a weight-average molecular weight $M_w$ of ≥50 and ≤500 kg/mol, preferably ≥75 and ≤300, more preferably ≥100 and ≤250. The polymer (A) may for example have a number-average molecular weight $M_n$ of ≥10 and ≤100 kg/mol, preferably ≥20 and ≤75, more preferably ≥25 and ≤50. The polymer (A) may have a molecular weight distribution MWD as indicated by the ratio $M_w/M_n$ of ≥1.0 and ≤10.0, preferably ≥2.0 and ≤7.5, more preferably ≥3.0 and ≤5.0.

In the context of the present invention, $M_n$, $M_w$, and $M_z$ are each expressed in kg/mol, and determined in accordance with ASTM $D_{6474}$ (2012).

The polymer (B) may for example have a density of a density of ≥945 and ≤965 kg/m3 as determined in accordance with ASTM $D_{792}$ (2008), preferably of ≥945 and ≤960 kg/m³, more preferably of ≥950 and ≤960 kg/m³, or of ≥955 and ≤965 kg/m³. The polymer (B) may for example have a melt mass-flow rate of ≥5.0 and ≤25.0 g/10 min, preferably of ≥5.0 and ≤20.0 g/10 min, more preferably of ≥7.5 and ≤15.0 g/10 min, as determined in accordance with ASTM D1238 (2013) at a temperature of 190° C. under a load of 21.6 kg.

It is preferred that the multi-layer film as used in the bag of the present invention comprises ≤3.0 wt % of low-density polyethylene (LDPE), preferably ≤2.0 wt % or ≤1.0 wt %, with regard to the total weight of the multi-layer film, preferably wherein the multi-layer film does not contain LDPE. Use of LDPE in such low quantities, or even the absence thereof, is understood to contribute to an improved dart impact strength of the bag.

In those embodiments of the present invention wherein the bag comprises a multi-layer films comprising or consisting of layers (a), (c) and (e), it is preferred that the layer (a) and the layer (e) each comprise ≥75.0 wt %, preferably ≥80.0 and ≤95.0 wt %, of the polymer (A), and ≥4.0, or ≥5.0, preferably 5.0 and ≤20.0 wt %, of the polymer (B), wherein the wt % of each of the polymer (A) and (B) is expressed with regard to the total weight of each of layer (a) or (e), respectively, preferably wherein the compositions of layer (a) and that of layer (e) are the same.

In those embodiments of the present invention wherein the bag comprises a multi-layer films comprising or consisting of layers (a), (c) and (e), it is preferred that the layer (c) comprises ≥30.0 and ≤70.0 wt %, preferably ≥40.0 and ≤60.0, of the polymer (A) and ≥30.0 and ≤70.0 wt %, preferably ≥40.0 and ≤60.0, of the polymer (B), with regard to the total weight of the layer (c).

In a certain embodiment of the invention, the multi-layer film consists of the layers (a), (c) and (e).

In those embodiments of the present invention wherein the bag comprises a multi-layer films comprising or consisting of layers (a), (c) and (e), it is preferred that:
- the weight of the layer (a) is ≥10.0 and ≤40.0 wt %, preferably ≥20.0 and ≤30.0 wt %; and/or
- the weight of the layer (c) is ≥20.0 and ≤80.0 wt %, preferably ≥40.0 and ≤60.0 wt %; and/or
- the weight of the layer (e) is ≥10.0 and ≤40.0 wt %, preferably ≥20.0 and ≤30.0 wt %;

wherein the weights of the layers (a), (c) and (e) are each expressed with regard to the total weight of the multi-layer film.

In those embodiments of the present invention wherein the bag comprises a multi-layer films comprising or consisting of layers (a), (c) and (e), it is preferred that:
the layer (a) has a thickness of ≥10.0 and ≤40.0 μm, preferably ≥20.0 and ≤30.0 μm; and/or
the layer (c) has a thickness of ≥20.0 and ≤80.0 μm, preferably ≥40.0 and ≤60.0 μm; and/or
the layer (e) has a thickness of ≥10.0 and ≤40.0 μm, preferably ≥20.0 and ≤30.0 μm.

Alternatively, the present invention also relates to embodiments wherein the multi-layer film, next to the layers (a), (c) and (e), further comprises:
(b) a first intermediate layer; and
(d) a second intermediate layer
wherein layer (b) is positioned between layer (a) and layer (c), and layer (d) is positioned between layer (c) and layer (e).

In those embodiments of the present invention wherein the bag comprises a multi-layer films comprising or consisting of layers (a), (b), (c), (d) and (e), it is preferred that the layer (b) and the layer (d) each comprise ≥75.0 wt %, preferably ≥85.0 and ≤95.0 wt %, of the polymer (A), or consist of the polymer (A), wherein the wt % of each of the polymer (A) is expressed with regard to the total weight of each of layer (b) or (d), respectively, preferably wherein the compositions of layer (b) and that of layer (d) are the same.

In those embodiments of the present invention wherein the bag comprises a multi-layer films comprising or consisting of layers (a), (b), (c), (d) and (e), it is preferred that the layer (a) and the layer (e) each comprise ≥75.0 wt %, preferably ≥80.0 and ≤95.0 wt %, of the polymer (A), and ≥4.0, or ≥5.0, preferably ≥5.0 and ≤20.0 wt %, of the polymer (B), wherein the wt % of each of the polymer (A) and (B) is expressed with regard to the total weight of each of layer (a) or (e), respectively, preferably wherein the compositions of layer (a) and that of layer (e) are the same.

In those embodiments of the present invention wherein the bag comprises a multi-layer films comprising or consisting of layers (a), (b), (c), (d) and (e), it is preferred that the layer (c) comprises ≥75.0 wt %, preferably ≥85.0 and ≤99.0 wt %, of the polymer (A), or consists of the polymer (A), wherein the wt % of each of the polymer (A) is expressed with regard to the total weight of layer (c).

In certain embodiments of the invention, the bag comprise a multi-layer film consisting of the layers (a), (b), (c), (d) and (e).

In those embodiments of the present invention wherein the bag comprises a multi-layer films comprising or consisting of layers (a), (b), (c), (d) and (e), it is preferred that:
the weight of the layer (a) is ≥10.0 and ≤20.0 wt %, preferably ≥12.5 and ≤17.5 wt %; and/or
the weight of the layer (b) is ≥10.0 and ≤20.0 wt %, preferably ≥12.5 and ≤17.5 wt %; and/or
the weight of the layer (c) is ≥20.0 and ≤60.0 wt %, preferably ≥30.0 and ≤50.0 wt %; and/or
the weight of the layer (d) is ≥10.0 and ≤20.0 wt %, preferably ≥12.5 and ≤17.5 wt %; and/or
the weight of the layer (e) is ≥10.0 and ≤20.0 wt %, preferably ≥12.5 and ≤17.5 wt %;
wherein the weights of the layers (a), (b), (c), (d) and (e) are each expressed with regard to the total weight of the multi-layer film.

In those embodiments of the present invention wherein the bag comprises a multi-layer films comprising or consisting of layers (a), (b), (c), (d) and (e), it is preferred that:
the layer (a) has a thickness of ≥10.0 and ≤20.0 μm, preferably ≥12.5 and ≤17.5 μm; and/or
the layer (b) has a thickness of ≥10.0 and ≤20.0 μm, preferably ≥12.5 and ≤17.5 μm; and/or
the layer (c) has a thickness of ≥20.0 and ≤60.0 μm, preferably ≥30.0 and ≤50.0 μm; and/or
the layer (d) has a thickness of ≥10.0 and ≤20.0 μm, preferably ≥12.5 and ≤17.5 μm; and/or
the layer (e) has a thickness of ≥10.0 and ≤20.0 μm, preferably ≥12.5 and ≤17.5 μm.

The multi-layer film may for example have a thickness of ≥70 and ≤150 μm, preferably ≥80 and ≤120 μm.

The invention will now be illustrated by the following non-limiting examples.

The following materials were used in the examples:

| | |
|---|---|
| For polymer (A) | SABIC Supeer 7118NE |
| For polymer (B) | SABIC HDPE F00952J |
| LDPE | SABIC LDPE 2100N0 |
| TiO2 | Masterbatch of titanium dioxide 70 wt % in 30 wt % LDPE carrier resin |

Properties of the Materials:
Polymer (A): SABIC Supeer 7118NE

| Polymer | SABIC Supeer 7118 NE |
|---|---|
| MFR2 | 0.95 |
| Density | 919 |
| Ethylene units content | 91.1 |
| Comonomer units content | 8.9 |
| Comonomer type | C6 |
| Comonomer branch content | 13.5 |
| $M_n$ | 37 |
| $M_w$ | 130 |
| $M_z$ | 350 |
| $M_w/M_n$ | 3.6 |
| $M_z/M_w$ | 2.7 |
| $M_z/M_n$ | 9.5 |
| a-TREF <30 | 4.3 |
| a-TREF 30-94 | 65.9 |
| a-TREF >94 | 29.8 |
| Unsaturations | 270 |
| Storage modulus at loss modulus of 10.0 kPa | 1500 |
| Storage modulus at loss modulus of 1.0 kPa | 35 |

Wherein:
the MFR2 is the melt mass flow rate as determined in accordance with ASTM D1238 (2013) at a temperature of 190° C. under a load of 2.16 kg, expressed in g/10 min;
the density is determined in accordance with ASTM D792 (2008), expressed in kg/m³;
the ethylene units content indicates the weight quantity of units present in the polymer that are derived from ethylene, also referred to as the quantity of moieties derived from ethylene, with regard to the total weight of the polymer, expressed in wt %;
the comonomer content indicates the weight quantity of units present in the polymer that are derived from the comonomer, also referred to as the quantity of moieties derived from the comonomer, with regard to the total weight of the polymer, expressed in wt %;
the comonomer type indicates the type of comonomer used in the production of the polymer, where C6 is 1-hexene and C8 is 1-octene;
the comonomer branch content indicates the number of branches per 100 carbon atoms in the polymer, as determined via $^{13}$C-NMR;
$M_n$ is the number average molecular weight, $M_w$ is the weight average molecular weight, and $M_z$ is the z-average molecular weight, wherein $M_n$, $M_w$, and $M_z$ are each expressed in kg/mol, and determined in accordance with ASTM $D_{6474}$ (2012);

a-TREF<30 indicates the fraction of the polymer that is eluted in a-TREF according to the method presented above in the temperature range ≤30.0° C., expressed in wt %, and represents the amorphous fraction of the polymer, calculated by subtracting the a-TREF 30-94 and the a-TREF>94 fraction from 100.0 wt %;

a-TREF 30-94 indicates the fraction of the polymer that is eluted in a-TREF in the temperature range of >30.0 and ≤94.0° C., expressed in wt %, and represents the branched fraction of the polymer;

a-TREF>94 indicates the fraction of the polymer that is eluted in a-TREF in the temperature range of >94.0 and <140° C., expressed in wt %, and represents the linear fraction of the polymer;

the unsaturations indicate the sum of vinyl unsaturations, vinylene unsaturations, vinylidene unsaturations, triakyl unsaturations, and expressed in number of unsaturations per 1000000 chain carbon atoms, and are determined by $^{13}C$ NMR on a Bruker Avance 500 spectrometer equipped with a cryogenically cooled probe head operating at 125° C., whereby the samples are dissolved at 130° C. in $C_2D_2Cl_4$ containing DBPC as stabiliser the storage modulus and the loss modulus are determined using dynamical mechanical spectroscopy (DMS) frequency sweep measurements according to ISO 6721-10 at a temperature of 190° C. in a nitrogen environment using a parallel plate set-up, using a frequency range of 0.1-100 rad/s, at oscillation strain of 5%, and are expressed in Pa.

Polymer (B): SABIC HDPE F00952J: Density: 952 kg/m²; MFR2: 0.05 g/10 min; MFR21 (melt mass flow rate determined at 21.6 kg, 190°): 9.5 g/10 min.

Using the above materials, a number of 3-layer films and 5-layer films, each having a thickness of 110 μm, were produced via blown film extrusion, at a quantity of 500 kg/h, at a speed of 73 m/min, at a blow-up ratio of 1.9.

In the 3-layer films of the examples, layer (a) is a first outer layer, layer (c) the inner or core layer, and layer (e) the second outer layer, wherein the layers are ordered (a)-(c)-(e). In the 5-layer film of the examples, layer (a) is the first outer layer, layer (b) the first intermediate layer, layer (c) the inner or core layer, layer (d) the second intermediate layer, and layer (e) the second outer layer, wherein the layers are ordered (a)-(b)-(c)-(d)-(e).

The composition of the films is described in the table below:

| Film | Layer | Wt % | Thickness (μm) | Polymer (A) | Polymer (B) | LDPE | TiO₂ |
|---|---|---|---|---|---|---|---|
| 1 | (a) | 25.0 | 27.5 | 90.0 | 10.0 | | |
| | (c) | 50.0 | 55.0 | 44.0 | 50.0 | | 6.0 |
| | (e) | 25.0 | 27.5 | 90.0 | 10.0 | | |
| 2 | (a) | 14.0 | 15.4 | 90.0 | 10.0 | | |
| | (b) | 15.0 | 16.5 | | 91.0 | | 9.0 |
| | (c) | 42.0 | 46.2 | 100.0 | | | |
| | (d) | 15.0 | 16.5 | | 91.0 | | 9.0 |
| | (e) | 14.0 | 15.4 | 90.0 | 10.0 | | |
| 3 (c) | (a) | 14.0 | 15.4 | 90.0 | | 10.0 | |
| | (b) | 16.5 | 18.1 | | 92.0 | | 8.0 |
| | (c) | 39.0 | 43.0 | 100.0 | | | |
| | (d) | 16.5 | 18.1 | | 92.0 | | 8.0 |
| | (e) | 14.0 | 15.4 | 90.0 | | 10.0 | |
| 4 | (a) | 14.0 | 15.4 | 90.0 | 10.0 | | |
| | (b) | 16.5 | 18.1 | | 92.0 | | 8.0 |
| | (c) | 39.0 | 43.0 | 100.0 | | | |
| | (d) | 16.5 | 18.1 | | 92.0 | | 8.0 |
| | (e) | 14.0 | 15.4 | 90.0 | 10.0 | | |
| 5 (c) | (a) | 14.0 | 15.4 | 90.0 | | 10.0 | |
| | (b) | 17.5 | 19.3 | | 85.0 | 7.0 | 8.0 |
| | (c) | 37.0 | 40.6 | 100.0 | | | |
| | (d) | 17.5 | 19.3 | | 85.0 | 7.0 | 8.0 |
| | (e) | 14.0 | 15.4 | 90.0 | | 10.0 | |
| 6 | (a) | 14.0 | 15.4 | 90.0 | 10.0 | | |
| | (b) | 20.0 | 22.0 | 25.0 | 68.0 | | 7.0 |
| | (c) | 32.0 | 35.2 | 100.0 | | | |
| | (d) | 20.0 | 22.0 | 25.0 | 68.0 | | 7.0 |
| | (e) | 14.0 | 15.4 | 90.0 | 10.0 | | |
| 7 (c) | (a) | 14.0 | 15.4 | 90.0 | 10.0 | | |
| | (b) | 20.0 | 22.0 | 12.5 | 68.0 | 12.5 | 7.0 |
| | (c) | 32.0 | 35.2 | 100.0 | | | |
| | (d) | 20.0 | 22.0 | 12.5 | 68.0 | 12.5 | 7.0 |
| | (e) | 14.0 | 15.4 | 90.0 | 10.0 | | |
| 8 | (a) | 14.0 | 15.4 | 90.0 | 10.0 | | |
| | (b) | 17.0 | 18.7 | 36.0 | 56.0 | | 8.0 |
| | (c) | 38.0 | 41.8 | 78.0 | 22.0 | | |
| | (d) | 17.0 | 18.7 | 36.0 | 56.0 | | 8.0 |
| | (e) | 14.0 | 15.4 | 90.0 | 10.0 | | |
| 9 | (a) | 15.0 | 16.5 | 90.0 | 10.0 | | |
| | (b) | 20.0 | 22.0 | 100.0 | | | |
| | (c) | 30.0 | 33.0 | | 91.0 | | 9.0 |
| | (d) | 20.0 | 22.0 | 100.0 | | | |
| | (e) | 15.0 | 16.5 | 90.0 | 10.0 | | |
| 10 (c) | (a) | 15.0 | 16.5 | 90.0 | 10.0 | | |
| | (b) | 17.5 | 19.3 | 100.0 | | | |
| | (c) | 35.0 | 38.4 | | 77.0 | 15.0 | 8.0 |
| | (d) | 17.5 | 19.3 | 100.0 | | | |
| | (e) | 15.0 | 16.5 | 90.0 | 10.0 | | |
| 11 (c) | (a) | 25.0 | 27.5 | 90.0 | | 10.0 | |
| | (c) | 50.0 | 55.0 | 40.0 | 54.0 | | 6.0 |
| | (e) | 25.0 | 27.5 | 90.0 | | 10.0 | |

Wherein for each of polymer (A), polymer (B), LDPE, AB, and TiO₂, the numbers in the table indicate the weight % of each component w.r.t. the total weight of that layer. The examples indicated by the extension (c) represent comparative examples. All the films could be produced at good bubble stability. On the above films, the dart impact strength was tested, the results of which are presented in the table below.

| Film | Dart impact strength (g/μm) |
|---|---|
| 1 | 5.1 |
| 2 | 4.5 |
| 3 (c) | 3.8 |
| 4 | 4.1 |
| 5 (c) | 2.8 |
| 6 | 4.7 |
| 7 (c) | 3.0 |
| 8 | 5.2 |
| 9 | 4.4 |
| 10 (c) | 2.4 |
| 11 (c) | 4.8 |

The above shows that a bag according to the present invention has a desirably high dart impact strength, whilst being able to be produced via blown film extrusion at high speeds at high bubble stability.

The invention claimed is:

1. A bag for storing bulk goods, wherein the bag comprises a multi-layer film comprising:
 (a) a first outer layer
 (c) a core layer; and
 (e) a second outer layer wherein the layers (a), (c) and (e) are positioned vis-à-vis each other in this order; wherein the multi-layer film comprises:

≥50.0 wt %, with regard to the total weight of the multi-layer film, of a polymer (A) comprising moieties derived from ethylene and moieties derived from 1-hexene, wherein the polymer (A) has:
(i) a density of ≥910 and ≤930 kg/m³ as determined in accordance with ASTM D792 (2008);
(ii) a melt mass-flow rate of ≥0.5 and ≤5.0 g/10 min, as determined in accordance with ASTM D1238 (2013) at a temperature of 190° C. under a load of 2.16 kg;
(iii) a fraction that is eluted in analytical temperature rising elution fractionation (a-TREF) at a temperature≤30.0° C. of ≤6.0 wt %, with regard to the total weight of the polymer; and
(iv) a fraction eluted in a-TREF at a temperature>94.0° C. of ≥20.0 wt %, with regard to the total weight of the polymer; and ≥20.0 and ≤50.0 wt %, with regard to the total weight of the multi-layer film, of a polymer (B) comprising moieties derived from ethylene and >0.5 and ≤5.0 wt % of moieties derived from 1-butene, 1-hexene, or 1-octene, wherein the polymer (B) has:
(v) a density of ≥945 and ≤965 kg/m³ as determined in accordance with ASTM D792 (2008);
(vi) a melt mass-flow rate of ≥0.01 and ≤1.00, as determined in accordance with ASTM D1238 (2013) at a temperature of 190° C. under a load of 2.16 kg; and
(vii) a melt mass-flow rate of ≥5.0 and ≤50.0, as determined in accordance with ASTM D1238 (2013) at a temperature of 190° C. under a load of 21.6 kg;

wherein:
the weight of the layer (a) is ≥14.0 and ≤25.0 wt %;
the weight of the layer (c) is ≥32.0 and ≤50.0 wt %; and
the weight of the layer (e) is ≥14.0 and ≤25.0 wt %,
the weights of the layers (a), (c) and (e) each expressed with regard to the total weight of the multi-layer film.

2. The bag according to claim 1, wherein the multi-layer film comprises ≤3.0 wt % of a low-density polyethylene (LDPE), with regard to the total weight of the multi-layer film.

3. The bag according to claim 1, wherein the multi-layer film does not contain a low-density polyethylene.

4. The bag according to claim 1, wherein the layer (a) and the layer (e) each comprises ≥75.0 wt %, of the polymer (A), and ≥4.0 of the polymer (B), wherein the wt % of each of the polymer (A) and (B) is expressed with regard to the total weight of each of layer (a) or (e), respectively.

5. The bag according to claim 4, wherein the layer (a) and the layer (e) each comprises ≥80.0 and ≤95.0 wt % of the polymer (A), and ≥5.0 and ≤20.0 wt % and of the polymer (B), wherein the wt % of each of the polymer (A) and (B) is expressed with regard to the total weight of each of layer (a) or (e), respectively.

6. The bag according to claim 1, wherein
the layer (a) has a thickness of ≥10.0 and ≤40.0 μm; and/or
the layer (c) has a thickness of ≥20.0 and ≤80.0 μm; and/or
the layer (e) has a thickness of ≥10.0 and ≤40.0 μm.

7. The bag according to claim 1, wherein the multi-layer film further comprises:
(b) a first intermediate layer; and
(d) a second intermediate layer wherein layer (b) is positioned between layer (a) and layer (c), and layer (d) is positioned between layer (c) and layer (e).

8. The bag according to claim 7, wherein the layer (b) and the layer (d) each comprises ≥75.0 wt %, of the polymer (A), or consists of the polymer (A), wherein the wt % of each of the polymer (A) is expressed with regard to the total weight of each of layer (b) or (d), respectively.

9. The bag according to claim 7, wherein the layer (a) and the layer (e) each comprises ≥75.0 wt %, of the polymer (A), and ≥4.0 of the polymer (B), wherein the wt % of each of the polymer (A) and (B) is expressed with regard to the total weight of each of layer (a) or (e), respectively.

10. The bag according to claim 7, wherein the layer (c) comprises ≥75.0 wt %, of the polymer (A), or consists of the polymer (A), wherein the wt % of each of the polymer (A) is expressed with regard to the total weight of layer (c).

11. The bag according to claim 7, wherein the multi-layer film consists of the layers (a), (b), (c), (d) and (e).

12. The bag according to claim 7, wherein
the weight of the layer (b) is ≥15.0 and ≤20.0 wt %; and
the weight of the layer (d) is ≥15.0 and ≤20.0 wt %;
wherein the weights of the layers (a), (b), (c), (d) and (e) are each expressed with regard to the total weight of the multi-layer film.

13. The bag according to claim 7, wherein
the layer (a) has thickness of ≥10.0 and ≤20.0 μm; and/or
the layer (b) has a thickness of ≥10.0 and ≤20.0 μm; and/or
the layer (c) has a thickness of ≥20.0 and ≤60.0 μm; and/or
the layer (d) has a thickness of ≥10.0 and ≤20.0 μm; and/or
the layer (e) has a thickness of ≥10.0 and ≤20.0 μm.

14. The bag according to claim 1, wherein the multi-layer film has a thickness of ≥70 and ≤150 μm.

15. The bag according to claim 1, wherein the layer (c) comprises ≥30.0 and ≤70.0 wt %, of the polymer (A) and ≥30.0 and ≤70.0 wt %, of the polymer (B), with regard to the total weight of the layer (c).

16. The bag according to claim 15, wherein the layer (c) comprises ≥40.0 and ≤60.0 wt %, of the polymer (A) and ≥40.0 and ≤60.0 wt %, of the polymer (B), with regard to the total weight of the layer (c).

17. A bag for storing bulk goods, wherein the bag comprises a multi-layer film comprising:
(a) a first outer layer
(c) a core layer; and
(e) a second outer layer
wherein the layers (a), (c) and (e) are positioned vis-à-vis each other in this order; wherein the multi-layer film comprises:
≥50.0 wt %, with regard to the total weight of the multi-layer film, of a polymer (A) comprising moieties derived from ethylene and moieties derived from 1-hexene, wherein the polymer (A) has:
(i) a density of ≥910 and ≤930 kg/m³ as determined in accordance with ASTM D792 (2008);
(ii) a melt mass-flow rate of ≥0.5 and ≤5.0 g/10 min, as determined in accordance with ASTM D1238 (2013) at a temperature of 190° C. under a load of 2.16 kg;
(iii) a fraction that is eluted in analytical temperature rising elution fractionation (a-TREF) at a temperature≤30.0° C. of ≤6.0 wt %, with regard to the total weight of the polymer; and (iv) a fraction eluted in a-TREF at a temperature>94.0° C. of ≥20.0 wt %, with regard to the total weight of the polymer; and ≥20.0 and ≤50.0 wt %, with regard to the total weight of the multi-layer film, of a polymer (B) comprising moieties derived from ethylene and >0.5 and ≤5.0 wt % of moieties derived from 1-butene, 1-hexene, or 1-octene, wherein the polymer (B) has:

(v) a density of ≥945 and ≤965 kg/m³ as determined in accordance with ASTM D792 (2008);

(vi) a melt mass-flow rate of ≥0.01 and ≤1.00, as determined in accordance with ASTM D1238 (2013) at a temperature of 190° C. under a load of 2.16 kg; and (vii) a melt mass-flow rate of ≥5.0 and ≤50.0, as determined in accordance with ASTM D1238 (2013) at a temperature of 190° C. under a load of 21.6 kg;

wherein:

the weight of the layer (a) is ≥14.0 and ≤25.0 wt %;

the weight of the layer (c) is ≥32.0 and ≤50.0 wt %; and the weight of t layer (e) is ≥14.0 and ≤25.0 wt %, the weights of the layers (a), (c) and (e) each expressed with regard to the total weight of the multi-layer film; and wherein at least one layer of the multi-layer film comprises 6.0 to 9.0 wt % of titanium dioxide.

18. A bag for storing bulk goods, wherein the bag comprises a multi-layer film comprising:

(a) a first outer layer (c) a core layer; and (e) a second outer layer wherein the layers (a), (c) and (e) are positioned vis-à-vis each other in this order; wherein the multi-layer film comprises:

≥50.0 wt %, with regard to the total weight of the multi-layer film, of a polymer (A) comprising moieties derived from ethylene and moieties derived from 1-hexene, wherein the polymer (A) has:

(i) a density of ≥910 and ≤930 kg/m³ as determined in accordance with ASTM D792 (2008);

(ii) a melt mass-flow rate of ≥0.5 and ≤5.0 g/10 min, as determined in accordance with ASTM D1238 (2013) at a temperature of 190° C. under a load of 2.16 kg;

(iii) a fraction that is eluted in analytical temperature rising elution fractionation (a-TREF) at a temperature≤30.0° C. of ≤6.0 wt %, with regard to the total weight of the polymer; and (iv) a fraction eluted in a-TREF at a temperature>94.0° C. of ≥20.0 wt %, with regard to the total weight of the polymer; and ≥20.0 and ≤50.0 wt %, with regard to the total weight of the multi-layer film, of a polymer (B) comprising moieties derived from ethylene and >0.5 and ≤5.0 wt % of moieties derived from 1-butene, 1-hexene, or 1-octene, wherein the polymer (B) has:

(v) a density of ≥945 and ≤965 kg/m³ as determined in accordance with ASTM D792 (2008);

(vi) a melt mass-flow rate of ≥0.01 and ≤1.00, as determined in accordance with ASTM D1238 (2013) at a temperature of 190° C. under a load of 2.16 kg; and (vii) a melt mass-flow rate of ≥5.0 and ≤50.0, as determined in accordance with ASTM D1238 (2013) at a temperature of 190° C. under a load of 21.6 kg;

wherein;

the weight of the layer (a) is ≥14.0 and ≤25.0 wt %;

the weight of the layer (c) is ≥32.0 and ≤50.0 wt %; and the weight of the layer (e) is ≥14.0 and ≤25.0 wt %, the weights of the layers (a), (c) and (e) each expressed with regard to the total weight of the multi-layer film; and wherein the multi-layer film has a dart impact of ≥4.1 g/μm and ≤5.2 g/μm as determined in accordance with ASTM D1709, method A.

* * * * *